July 23, 1963

P. N. MURPHY 3,098,545

EMERGENCY BRAKE

Filed July 10, 1961

PATRICK N. MURPHY
INVENTOR.

BY

ATTORNEY 3,098,545
     EMERGENCY BRAKE
Patrick N. Murphy, 2304 Edwards Ave.,
         Bakersfield, Calif.
   Filed July 10, 1961, Ser. No. 123,398
      3 Claims. (Cl. 188—76)

This invention relates to vehicle brakes and particularly to emergency brakes for highway freight vehicles.

It is an object of the invention to provide a simple, relatively inexpensive emergency brake which is applicable to highway freight vehicles either during or after the manufacture of said vehicles.

Another object of the invention is to produce an emergency brake which has a simultaneous, external and internal braking action on a cylindrical brake drum.

A further object of the invention is to produce an emergency brake which is designed to be added as an accessory to a type of highway freight vehicle which is in common use, without any major alternation being required incidental to such installation.

Figure 1:
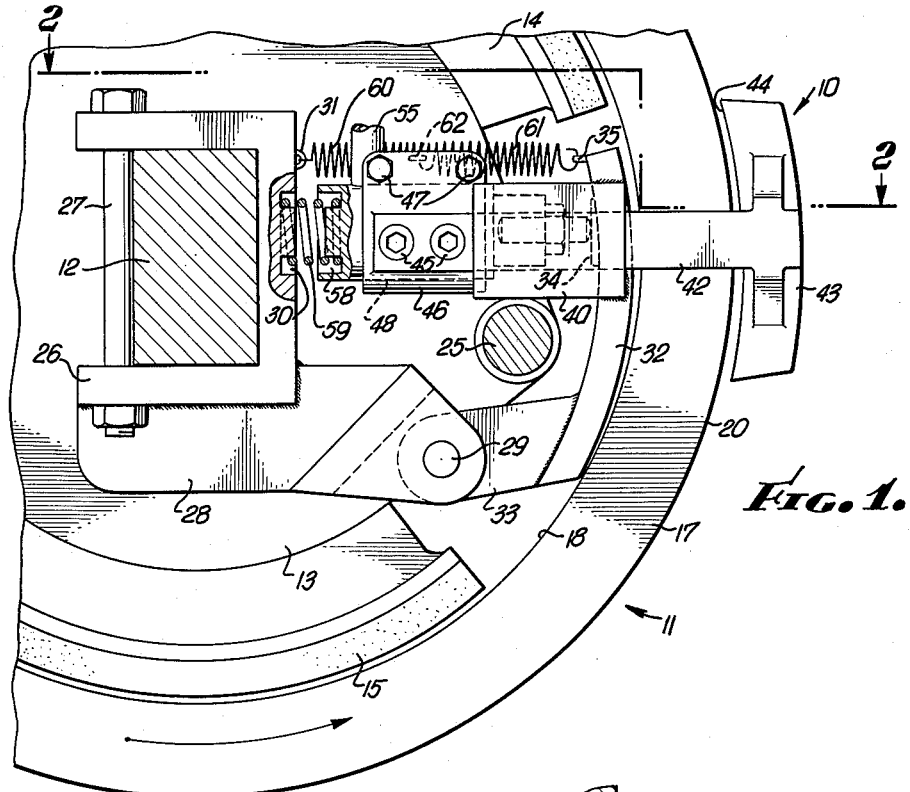

The manner of accomplishing the foregoing objects as well as further objects and advantages will be made manifest in the following description taken in connection with the accompanying drawings in which FIG. 1 is a diagrammatic fragmentary vertical sectional view through the back axle of a type of highway freight vehicle in common use, and illustrates a preferred embodiment of the present invention applied to said axle.

Figure 2:
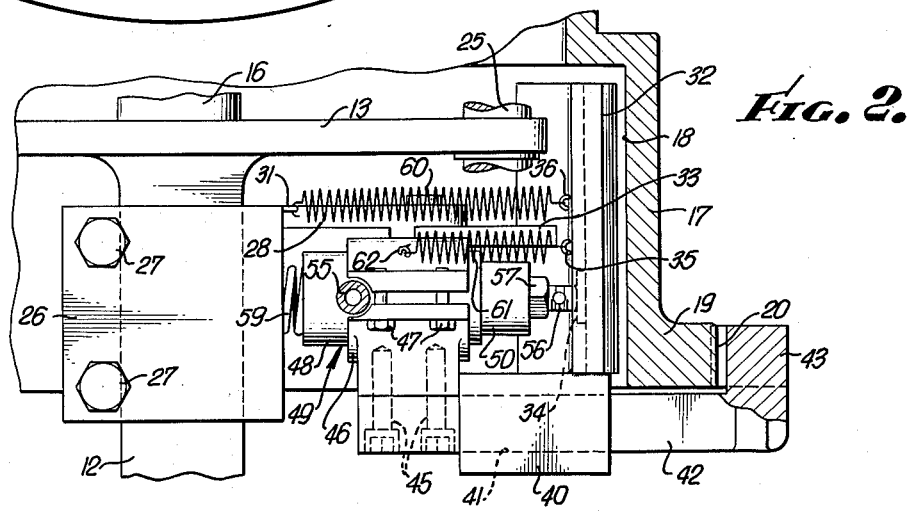

FIG. 2 is a horizontal sectional view taken on the line 2—2 of FIG. 1.

Referring specifically to the drawing, the embodiment of the invention disclosed therein comprises an emergency brake 10, with this mounted on a highway freight vehicle 11, the only details of the latter illustrated being such as are necessary to disclose the relationship of this to the invention.

The vehicle 11 may be a highway freight trailer having a solid rear axle 12 which is rectangular in cross section and has a brake shoe mounting disk 13 on which a pair of brake shoes 14 and 15 are pivotally mounted and a cylindrical axle stud 16 on which a wheel (not shown) of said vehicle is rotatably mounted to rotate concentrically with axle stud 16, this wheel being provided with a cylindrical brake drum 17. The drum 17 has an internal cylindrical braking surface 18 and the inner open mouth of said drum is reinforced by an external annular flange 19 having an external cylindrical braking surface 20 provided thereon.

Suitable mechanism (not shown) is conventionally provided in vehicles such as the vehicle 11 which means is actuated by rotation of a shaft 25 in operation of the ordinary service brake system of the vehicle to shift the service shoes 14 and 15 outwardly into braking relation with the brake surface 18 of the drum 17 in the ordinary operation of the vehicle. The complete service brake operating mechanism of the vehicle 11 is not disclosed herein as this is not involved in the operation of the emergency brake 10 of the present invention. The portions of the truck 11 illustrated are merely to show how the brake 10 is designed to be installed as an accessory to fit around the standard parts of the vehicle 11 without requiring any major alteration of the latter.

It is to be noted that adjacent ends of the brake shoes 14 and 15 of the service brake system of the vehicle 11, which are the free ends of these shoes, are spaced apart a substantial distance. The present invention utilizes the presence of this space in the common type of vehicle 11 for the introduction of the emergency brake 10 into the space within the brake drum 17.

Thus, the brake 10 includes a heavy U-shaped clamp 26 which snugly fits over the axle 12 and is rigidly secured thereto by bolts 27. Welded to a lower portion of the clamp 26 is an internal brake shoe mounting bracket 28 the extremity of which extends toward the brake drum 17 to provide bifurcated support for a pivot pin 29. Formed in a vertical face of the clamp 26 for a purpose to be made clear hereinafter is a circular spring retaining groove 30 (FIG. 1). The clamp 26 is also provided with a spring securing eye 31.

Disposed within the brake drum 17 between adjacent free ends of service brake shoes 14 and 15 is an internal emergency brake shoe 32 which is arcuate in outline so that the outer surface thereof is of the same radius as the internal braking surface 18 of the drum 17. Welded to the lower end of shoe 32 is an arm 33 which is received by the bifurcated end of bracket 28 and is apertured to receive pivot pin 29 so as to pivotally mount the shoe 32 on said bracket. Provided on the inside face of shoe 32 near its upper end is a flat boss 34 and a pair of spring securing eyes 35 and 36.

Integrally united with the emergency internal brake shoe 32, as by welding, at the edge of said shoe adjacent the mouth of the drum 17 is a slide block 40 having a rectangular internal slideway 41 formed therein on an axis substantially normal with the axis of rotation of the drum 17. Slidably mounted in slide block 40 is a slide bar 42 with a cross section to slidably fit the slideway 41. Welded on the outer end of bar 42 in offset relation therewith is an external emergency brake shoe 43, this shoe being arcuate in form as shown in FIG. 1 with an internal shoe face 44 having the same radius as the external braking face 20 on the brake drum 17. The inner end of bar 42 has secured thereto by Allen screws 45 a clamp 46 having bolts 47 by which the clamp rigidly mounts the cylinder 48 of a hydraulic ram 49 on the inner end of slide bar 42. The ram 49 also includes a plunger 50 which is slidable within the cylinder 48 and is moved outwardly from its innermost position in the cylinder, in which it is shown in the drawing, when liquid is forced into the cylinder 48 through a liquid supply pipe 55. The plunger 50 has a tapped axial hole for threadedly receiving a screw 56 having a set nut 57 for adjusting the effective length of plunger 50 so as to bring the end of screw 56 into contact with flat boss 34 of the internal emergency shoe 32 when the ram 49 is de-energized and the shoe 32 is swung inwardly out of contact with the drum 17 as shown in the drawings by means to be described hereinafter.

The inner end of the cylinder 48 of the ram 49 is shaped to provide an annular spring retaining groove 58 in which a relatively stiff coiled cushion spring 59 is trapped with its opposite end in groove 30 as shown in FIG. 1, so as to hold the inner end of cylinder 48 yieldably spaced a substantial distance from the clamp 26.

Secured at its opposite ends to spring connecting eyes 31 and 36 is a coiled contractile spring 60 which constantly pulls the internal emergency brake shoe 32 away from the drum 17 which results, when the ram 49 is de-energized, in the parts of the emergency brake 10 being disposed as shown in the drawings. The cushion spring 59 holds the clamp 46 forwardly against the slide block 40 when the ram is thus de-energized so that the external emergency brake shoe 43 is spaced out of contact with the external cylindrical drum face 20. The relatively lighter spring 60 operates to hold the slide block 40 inwardly against the clamp 46 as shown in the drawings whenever the ram 49 is de-energized, thereby holding the internal emergency brake shoe 32 out of contact with the internal drum surface 18 of the drum 17.

An auxiliary spring 61 having one end connected to eye 35 on shoe 32, and the other end connected to an eye 62 provided on clamp 46 operates to shift block 40 against clamp 46 independently of the action of spring 60.

Operation

The pressure liquid control pipe 55 of the ram 49 is connected preferably to a source for liquid under high pressure under direct control of the operator of the vehicle 11 in the cab of the truck which is towing this vehicle. When the truck and trailer are operating normally without any need for use of the emergency brake 10, the parts of the latter remain as shown in the drawings, out of contact with the brake drum 17.

When the truck operator has difficulty holding his truck with the normal service brake system and finds an emergency braking operation necessary, he operates the means at hand (not shown) for supplying liquid under high pressure through the pipe 55 to the ram 49 which forces plunger 50 from the cylinder 48 in a rightward direction (as viewed in the drawings). The first result of this is to swing the shoe 32 about the pin 29 until the external face of this shoe pressurally engages the internal surface 18 of the drum 17. The inner end of the cylinder 48 of the ram 49 remains in contact with the cushion spring 59 during the action just described, this spring however being slightly twisted by the upward slanting of the ram 49 as it swings with the shoe 32 about the pin 29. When the shoe 32 comes to rest against the drum 17 the further introduction of liquid through the pipe 55 into the ram 49 starts compressing the cushion spring 59 until the external emergency brake shoe 43 is pulled into pressural engagement with the external cylindrical braking face 20 on the brake drum 17.

Upon the internal shoe 32 and external shoe 43 thus having been brought into cooperative gripping relation with the opposite braking surfaces 18 and 20 on the drum 17, any increase in hydraulic pressure applied to the ram 49 through the pipe 55 exerts a positive increase in the braking action effected by the emergency brake 10. It is thus evident that, whenever this is desired by the truck driver, a substantial additional braking action can be provided by operation of the emergency brake 10.

As soon as the need for the emergency brake 10 has passed, the operator merely de-energizes the ram 49 by relieving it from the pressure which had been applied through the pressure liquid pipe 55. Upon this being done, the spring 60 returns the inner shoe 32 to its inactive position as shown in the drawings and the cushion spring 59 expands to shift the outer shoe 43 outwardly to its inactive position. It is thus seen that the emergency brake 10 of the present invention provides a very positive and substantial emergency braking action whenever this is required and immediately upon the emergency being passed, automatically restores itself to inactive position upon the operator of the vehicle relaxing the fluid pressure thereon.

The claims are:

1. An emergency brake designed as an accessory to be applied to an axle of a highway freight vehicle in association with a cylindrical brake drum provided on a wheel rotatably mounted on said axle, the combination of: a clamp designed to tightly grip said axle to mount said brake thereon, a substantial portion of said clamp when so applied to said axle lying within said brake drum; an internal brake shoe mounting arm provided on said clamp and extending towards said drum; an arcuate internal brake shoe pivotally mounted on said arm for swinging movement towards and away from face-to-face contact with the cylindrical inner surface of said drum; a slide block integrally united with said internal shoe along an edge of the latter disposed adjacent the open mouth of said drum, a major portion of said block being disposed outside said mouth, said slide block having a slideway of rectangular cross section, said slide way being disposed approximately normal to the axis of said drum; a slide bar of rectangular cross section slidably fitting within said slideway; an external brake shoe fixed to the outer end of said slide bar in an offset relation therewith so as to be disposed radially outwardly from said brake drum in closely juxtaposed relation therewith, said external shoe being arcuate in shape and adapted to closely fit said drum when moved into contact with the latter; a hydraulic ram including a cylinder which is rigidly fixed on an inwardly extending portion of said slide bar, and a plunger slidable in said cylinder, said plunger being extended, when said ram is actuated, into contact with said internal shoe to move said shoe away from said cylinder and into engagement with said brake drum and to draw said slide bar inwardly through said block and cause said external shoe to pressurally engage said brake drum on the opposite face thereof from where said drum is engaged by said internal brake shoe.

2. A combination as in claim 1 in which a cushion spring is provided between said clamp and said cylinder to normally hold the latter spaced from said clamp; and a tension spring connected at its opposite ends to said clamp and to said internal brake shoe to hold the latter normally in spaced relation with said brake drum and to hold said cylinder in contact with said cushion spring.

3. In an emergency brake for a highway freight vehicle, which vehicle has a non-rotating axle, a wheel rotatable on said axle and a brake drum mounted on said wheel and surrounding an end portion of said axle, the combination of: a clamp applied, when in use, to said axle so as to be disposed within said drum; an internal arcuate brake shoe having an arcuate external braking surface of equal radius with the inside of said drum, said shoe being pivotally mounted on said clamp on an axis parallel with the axis of said drum and disposed a substantial distance outside the area embraced by radial lines drawn through said drum axis and through opposite ends of said shoe braking surface, whereby said shoe is swingable bodily about said pivotal axis to and from a position in which said braking surface of said shoe conforms to the inner surface of said drum; an external brake shoe positioned outside said drum and having an arcuate internal braking surface of the same radius as the outside surface of said drum; an approximately radially positioned bar disposed close to said drum, said external brake shoe being mounted on the outer end of said bar; a slide box integral with said internal brake shoe and slidably receiving said bar to guide said external brake shoe in rectilinear movement toward and away from said internal brake shoe and place said braking surfaces of said shoes in concentric relation when they both engage said drum; a hydraulic ram mounted on the inner end of said bar and parallel with the latter and having a plunger which is thrust outwardly therefrom against said inner shoe when said ram is energized, to simultaneously apply said brake shoes to said brake drum; and spring means shifting said shoes apart and out of contact with said drum when said ram is not energized.

References Cited in the file of this patent

UNITED STATES PATENTS

| | | |
|---|---|---|
| 2,268,685 | Walther et al. | Jan. 6, 1942 |
| 2,783,858 | Murphy | Mar. 5, 1957 |